(12) United States Patent
Niimi et al.

(10) Patent No.: US 7,302,750 B2
(45) Date of Patent: Dec. 4, 2007

(54) METHOD OF MANUFACTURING ARMATURE OF ROTARY ELECTRIC MACHINE

(75) Inventors: Masami Niimi, Handa (JP); Tsutomu Shiga, Nukata-gun (JP); Masanori Oomi, Anjo (JP)

(73) Assignee: Denso Corporation, Kariya (JP)

( * ) Notice: Subject to any disclaimer, the term of this patent is extended or adjusted under 35 U.S.C. 154(b) by 375 days.

(21) Appl. No.: 10/887,809

(22) Filed: Jul. 12, 2004

(65) Prior Publication Data
US 2005/0046298 A1 Mar. 3, 2005

(30) Foreign Application Priority Data
Aug. 29, 2003 (JP) .............................. 2003-305891

(51) Int. Cl.
H02K 15/04 (2006.01)
H02K 15/09 (2006.01)

(52) U.S. Cl. .......................... 29/598; 29/596; 310/261

(58) Field of Classification Search ................ 29/596, 29/598; 310/201, 198, 261, 179, 180, 195, 310/254
See application file for complete search history.

(56) References Cited

U.S. PATENT DOCUMENTS

| | | | | |
|---|---|---|---|---|
| 2,333,200 A | * | 11/1943 | Roe ............................. | 310/211 |
| 4,437,230 A | * | 3/1984 | Greutmann .................... | 29/597 |
| 5,508,577 A | * | 4/1996 | Shiga et al. ................. | 310/201 |
| 5,650,683 A | | 7/1997 | Shiga et al. ................. | 310/201 |
| 5,739,617 A | | 4/1998 | Katoh et al. | |
| 5,745,977 A | * | 5/1998 | Ichikawa et al. ............. | 29/598 |
| 5,778,512 A | * | 7/1998 | Ichikawa et al. ............. | 29/598 |
| 5,864,193 A | * | 1/1999 | Katoh ......................... | 310/214 |
| 6,018,209 A | * | 1/2000 | Katoh et al. ................. | 310/270 |
| 6,154,950 A | * | 12/2000 | Katahira et al. .............. | 29/598 |
| 6,476,530 B1 | * | 11/2002 | Nakamura et al. .......... | 310/201 |
| 2004/0189133 A1 | | 9/2004 | Baumann et al. ............ | 310/215 |

FOREIGN PATENT DOCUMENTS

| | | |
|---|---|---|
| DE | 558 486 | 9/1932 |
| JP | U-54-004312 | 6/1977 |
| JP | A 7-231617 | 8/1995 |
| JP | A-9-51645 | 2/1997 |
| JP | A-09-312961 | 12/1997 |
| WO | WO 03/009988 A | 2/2003 |
| WO | WO 03009988 A1 * | 2/2003 |

* cited by examiner

Primary Examiner—Peter Vo
Assistant Examiner—Livius R. Cazan
(74) Attorney, Agent, or Firm—Oliff & Berridge, PLC

(57) ABSTRACT

An armature of a rotary electric machine composed of an armature core, an armature winding and a shaft is manufactured in the following manner. A conductor bar including plural conductors connected in line is formed, and each conductor is cut out from the conductor bar. The conductor in a straight shape is inserted into each slot of the armature core, and then both side portions of the conductor are bent at substantially right angle so that the side portions are positioned along axial end surfaces of the armature core. The side portions are further skewed and electrically connected to form the armature winding. An outer surface of the side portions circularly arranged on the axial end surface of the armature core is used as a commutator surface.

5 Claims, 4 Drawing Sheets

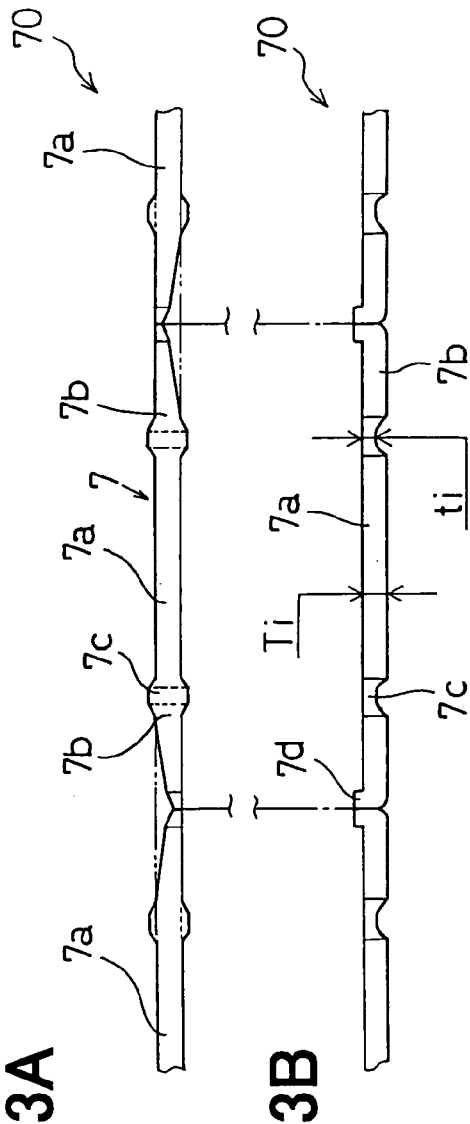
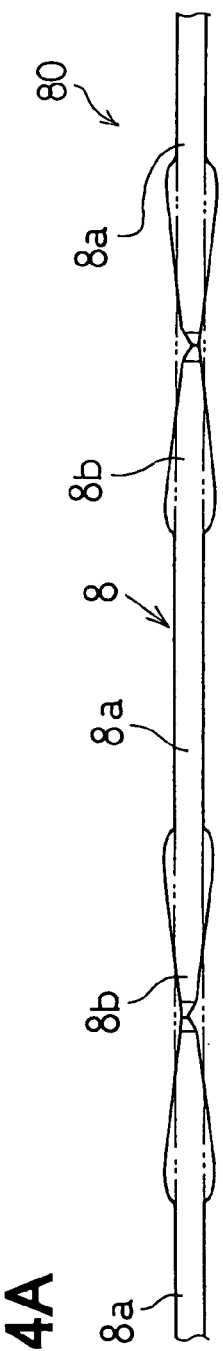
FIG. 3A
FIG. 3B
FIG. 4A
FIG. 4B

METHOD OF MANUFACTURING ARMATURE OF ROTARY ELECTRIC MACHINE

CROSS-REFERENCE TO RELATED APPLICATION

This application is based upon and claims benefit of priority of Japanese Patent Application No. 2003-305891 filed on Aug. 29, 2003, the content of which is incorporated herein by reference.

BACKGROUND OF THE INVENTION

1. Field of the Invention

The present invention relates to a method of manufacturing an armature of a rotary electric machine such as a direct current motor and to the armature manufactured by that method.

2. Description of Related Art

Recently, it has been becoming more important to develop automotive parts that are light in weight and small in size to reduce fuel consumption in an automobile vehicle and thereby to cope with the problem of global warming. One example of a light and small motor, which was invented by one of inventors of the present invention, is disclosed in JP-B2-2924605. In the armature of this motor, a conventional commutator is eliminated, and a commutator formed by part of the conductors disposed in an armature core is utilized. A pair of conductors consisting of an inner conductor and an outer conductor, each formed in a U-shape, is inserted in each slot formed in an armature core. Ends of the conductors are electrically and mechanically connected to thereby form an armature winding.

In the armature disclosed in JP-B2-2924605, however, the conductors are formed in a U-shape before they are inserted into the slots, and conductor portions disposed along the axial end surfaces of the armature core have to be skewed relative to the radial direction. The conductor has to be formed one by one using a complex transfer press, and therefore it has been difficult to further enhance the manufacturing speed. Further, it has not been easy to insert conductors, each having a U-shape and skewed ends, into the slots of the armature core. Therefore, there has been a certain limit in enhancing manufacturing speed in an automated assembling line.

SUMMARY OF THE INVENTION

The present invention has been made in view of the above-mentioned problem, and an object of the present invention is to provide an improved method of manufacturing an armature of a rotary electric machine and to provide an armature manufactured by the improved method. It is an object of the present invention, in particular, to speed up the process of manufacturing the armature that is small in size and light in weight.

The armature is composed of an armature core made by laminating plural steel plates, an armature winding disposed in slots formed in the armature core and an armature shaft connected to the armature core by forcibly inserting into a center hole of the armature core. The armature winding is composed of plural conductors electrically connected one another. In each slot of the armature core, an inner conductor is disposed at an inner portion of the slot and an outer conductor at an outer portion of the slot. Each of the inner and outer conductors is composed of an in-slot portion and a pair of side portions extending from both ends of the in-slot portion.

The armature is manufactured in the following manner. A conductor bar including plural conductors connected in a straight line is formed. Then, individual conductors are cut out from the conductor bar. The in-slot portion of the inner conductor is first inserted into each slot, and side portions are bent toward the axial end surfaces of the armature core, so that the side portions are positioned substantially in parallel to the axial end surfaces. The side portions are skewed by a predetermined angle α relative to the radial direction. The process of skewing may be performed simultaneously with the process of bending.

Then, the in-slot portion of the outer conductor is inserted into each slot and is firmly held in the slot by bending claws formed at the open edge of the slot. The side portions of the outer conductor are bent and skewed in the same manner as the inner conductor. However, the side portions of the outer conductor are skewed by another predetermined angle β in the opposite direction to the angle α. Then, ends of the side portions of both the inner and outer conductors are electrically and mechanically connected by welding to form the armature winding. Finally, an armature shaft is forcibly inserted into the center hole of the armature core.

The conductors are not bent in a U-shape before they are inserted into the slots. Therefore, the conductor bar including plural conductors connected in a straight line can be easily and speedily manufactured. It is easy to insert the conductors into the slots because they are straight. After the conductors are inserted into the slots, they are bent toward the axial end surfaces of the armature core and skewed. Therefore, the process of assembling the conductors to the armature core is simplified. If the bending process and the skewing process are performed at the same time, the manufacturing process is further speeded up.

The outer surface of the side portions circularly arranged on the axial end surface of the armature core is used as a commutator surface which brushes slidably contact. A cross-sectional area of each side portion is made so that its electrical resistance is uniform throughout its entire length. Since the outer surface of the side portions is utilized as the commutator surface without using a conventional commutator, the axial length of the armature is considerably shortened.

Other objects and features of the present invention will become more readily apparent from a better understanding of the preferred embodiment described below with reference to the following drawings.

BRIEF DESCRIPTION OF THE DRAWINGS

FIG. 3A is a plan view showing an inner conductor formed in a shape of a continuous line;

FIG. 3B is a side view showing the same inner conductor shown in FIG. 3A;

FIG. 4A is a plan view showing an outer conductor formed in a shape of a continuous line;

FIG. 4B is a side view showing the same outer conductor shown in FIG. 4A;

DETAILED DESCRIPTION OF THE PREFERRED EMBODIMENT

Figure 1:
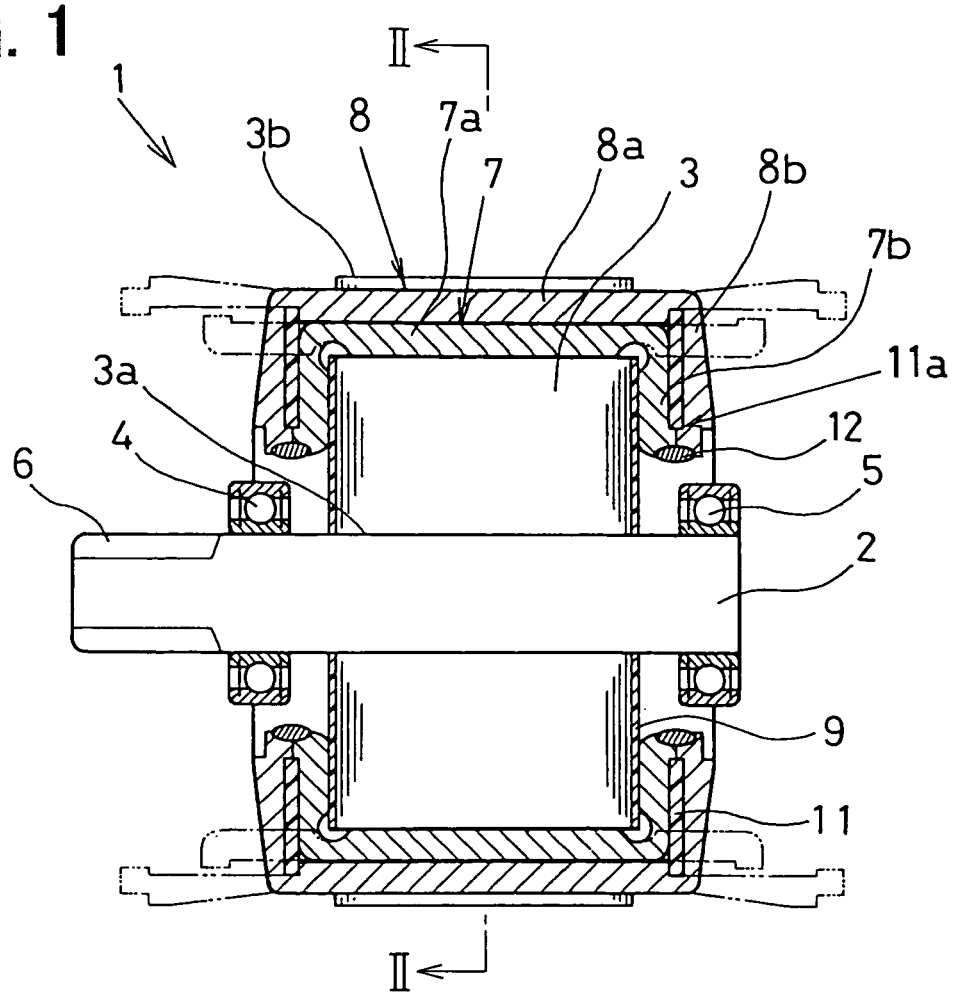
FIG. 1 is a cross-sectional view showing an armature of a rotary electric machine according to the present invention.

A preferred embodiment of the present invention will be described with reference to accompanying drawings. In this embodiment, the present invention is applied to an armature of a starter motor for cranking an internal combustion engine. As shown in FIG. 1, the armature 1 is composed of an armature core 3, an armature shaft 2 fixedly connected to the center of the armature core 3, and conductors 7, 8 inserted into slots 3b of the armature core 3. Dotted lines show positions of the conductors 7, 8 before their side portions are bent.

Figure 6:
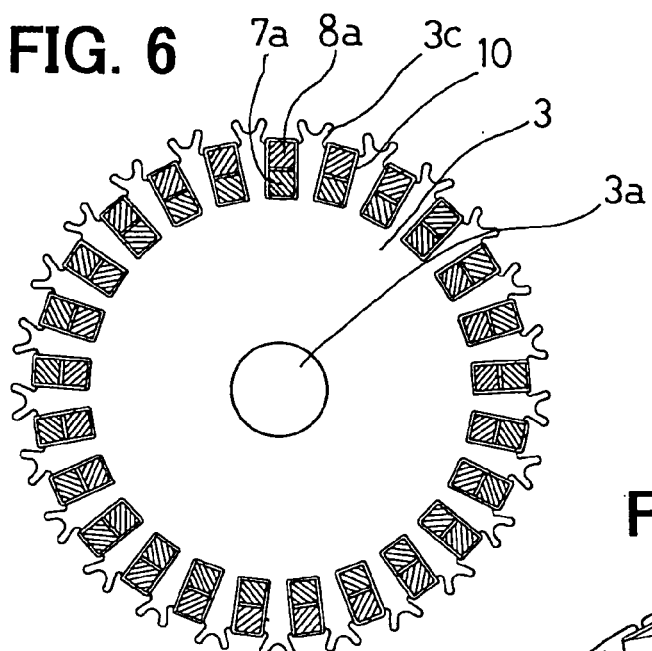
FIG. 6 is a cross-sectional view showing the armature, in which claws formed on the outer periphery are not closed yet, taken along line II-II shown in FIG. 1.

The armature shaft 2 is rotatably supported by a pair of bearings 4, 5 that is fixedly held in a motor housing (not shown). At an left end (in FIG. 1) of the armature shaft 2, a sun gear 6, which constitutes a part of a planetary gear speed reduction mechanism, is provided. That is, rotational torque of the armature 1 is transferred to a pinion gear of an engine through the planetary gear speed reduction mechanism. The armature core 3 is formed by laminating plural thin steel plates each having a center hole 3a and plural depressions formed on its outer periphery. The armature shaft 2 is forcibly inserted into the center hole 3a of the laminated armature core 3, and the depressions of each core plate are aligned to form slots 3b around the outer periphery of the armature core 3. As shown in FIG. 6, a pair of claws 3c are formed at each open end of the slot 3b.

An inner conductor 7 and an outer conductor 8 are inserted into each slot 3b, and the inner conductor 7 is positioned at the bottom of the slot 3b and the outer conductor 8 on the inner conductor, as shown in FIG. 1. As shown in FIGS. 3A and 3B, the inner conductor 7 is composed of an in-slot portion 7a and a pair of side portions 7b formed at both sides of the in-slot portion 7a. A conductor bar 70 that includes a plurality of inner conductors 7 connected in line is formed from a bar having a square or a rectangular cross-section (the bar shown in FIGS. 3A and 3B has a square cross-section). Individual inner conductors 7 are cut out from the conductor bar 70.

The width of the in-slot portion 7a shown in FIG. 3A is equal to its thickness Ti shown in FIG. 3B, and its length is substantially equal to an axial length of the slot 3b of the armature core 3. A bending portion 7c is formed between the in-slot portion 7a and the side portion 7b. Accordingly, two bending portions 7c are included in one inner conductor 7. The width of the bending portion 7c is wider than that of the in-slot portion 7a, and its thickness ti is thinner than the thickness Ti of the in-slot portion 7a.

The width of the side portion 7b is gradually decreased as it proceeds to the tip (tapered) as shown in FIG. 3A, and the thickness is the same as that of the in-slot portion 7a and uniformly made throughout its length as shown in FIG. 3B. At the end of the side portion 7b, a projection 7d is formed so that it projects toward a side portion 8b of the outer conductor 8 when the side portion 7b is bent as shown in FIG. 1.

The outer conductor 8 is formed in a similar manner as the inner conductor 7. As shown in FIGS. 4A and 4B, the outer conductor 8 is composed of an in-slot portion 8a and a pair of side portions 8b formed at both sides of the in-slot portion 8a. A conductor bar 80 that includes a plurality of outer conductors 8 connected in line is formed from a bar having a square or a rectangular cross-section (the bar shown in FIGS. 4A and 4B has a square cross-section). Individual outer conductors 8 are cut out from the conductor bar 80.

The width of the in-slot portion 8a shown in FIG. 4A is equal to its thickness To shown in FIG. 4B, and its length is a little longer than the axial length of the slot 3b of the armature core 3. A bending portion 8c is formed between the in-slot portion 8a and the side portion 8b. Accordingly, two bending portions 8c are included in one outer conductor 8. The width of the bending portion 8c is wider than that of the in-slot portion 8a, and its thickness "to" at the bending portion 8c is thinner than the thickness To of the in-slot portion 8a.

The width of the side portion 8b is gradually decreased (tapered) as it proceeds to the tip as shown in FIG. 4A, and its thickness is gradually increased from the bending portion 8c toward the end of the side portion 8b as shown in FIG. 4B. As a result, the side portion 8b is made so that its cross-sectional area is substantially equal throughout its entire length. A projection 8d is formed so that it projects toward a side portion 7b of the inner conductor 7 when the side portion 8b is bent as shown in FIG. 1. One of the axial surfaces formed by the side portions 8b is used as a commutator surface which brushes slidably contact.

Figure 2:
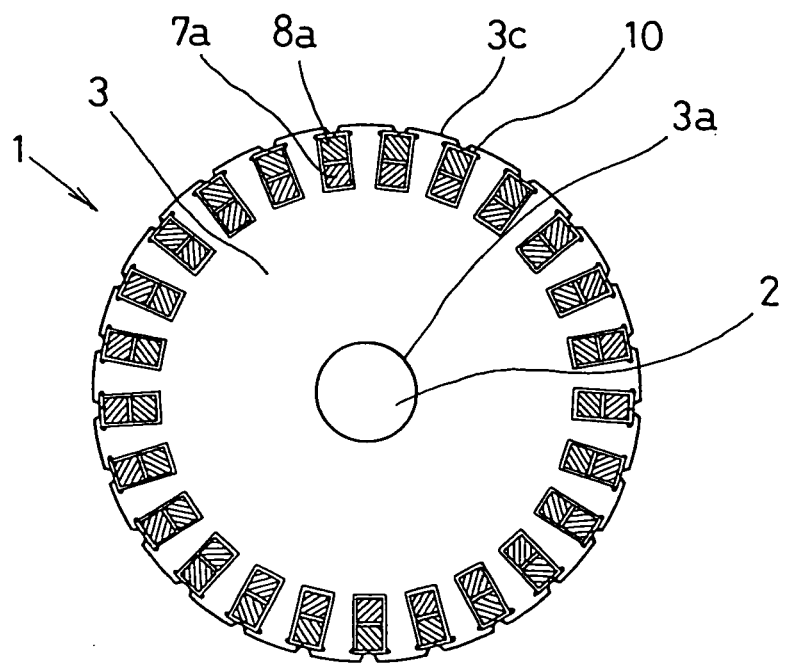
FIG. 2 is a cross-sectional view showing the armature, taken along line II-II shown in FIG. 1.
Figure 5A:
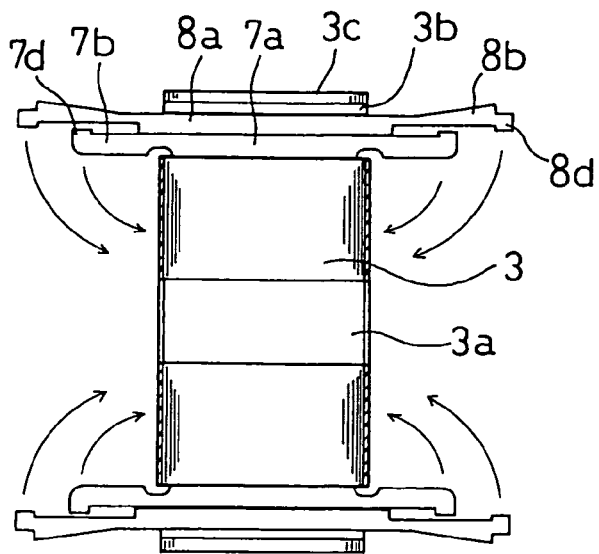
FIGS. 5A-5C sequentially show a process of assembling an armature.
Figure 5B:
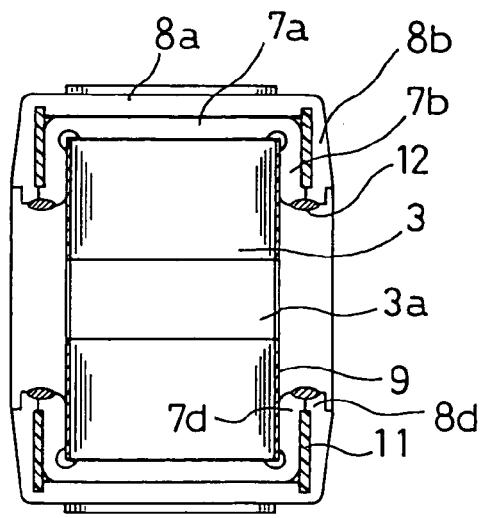
Figure 5C:
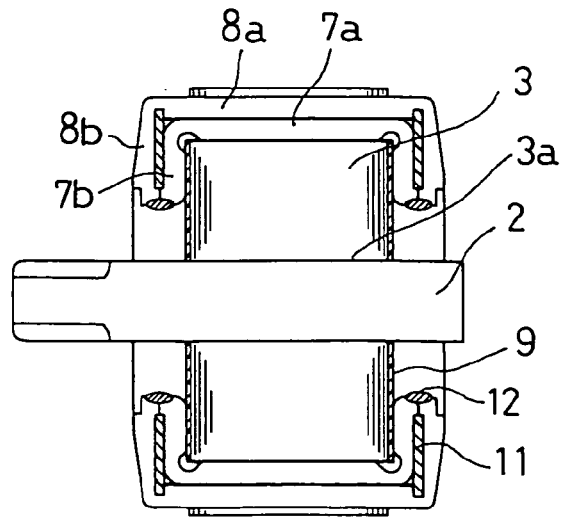
Figure 7:
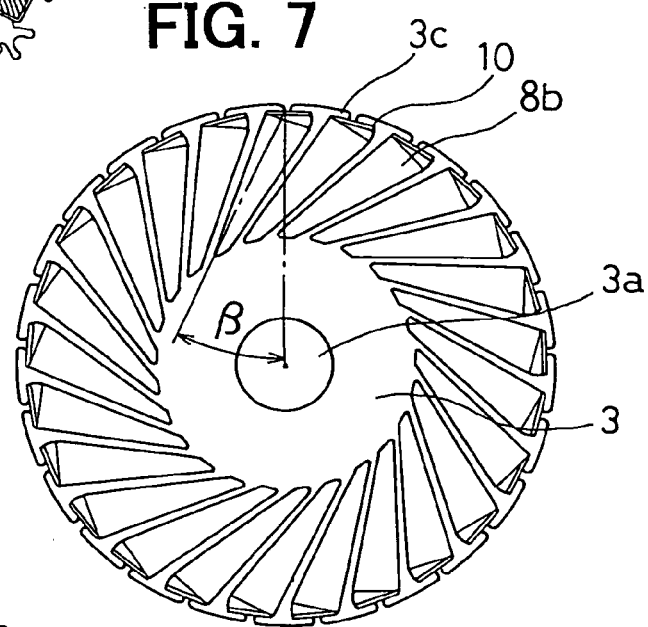
FIG. 7 is a plan view showing an axial end surface of an armature, where a commutator is formed, viewed in an axial direction of the armature.

Now, referring to FIGS. 5A-5C, a process of assembling the armature 1 will be described.

a) The inner conductors 7 are inserted into the slots 3b and positioned at the bottom of the slots 3b.

b) Then, both side portions 7b extending to both axial sides of the armature core 3 are bent at a substantially right angle, so that they are positioned along the axial end surfaces of the armature core 3. After all of the in-slot portions 7a of the inner conductors 7 are inserted into the slots 3b, their side portions 7b may be simultaneously bent, or the side portions 7b may be bent one by one.

c) The side portions 7b positioned along the axial surface of the armature core 3 are skewed by a predetermined angle α (not shown) relative to a radial line connecting a center of the slots 3b and the center of the armature core 3. The side portions 7b are positioned not to contact one another. An insulating plate 9 made of resin is disposed between the axial end surface of the armature core 3 and the side portions 7b of the inner conductor 7.

d) The in-slot portions 8a of the outer conductors 8 are inserted into the slots 3b and positioned on the in-slot portions 7b of the inner conductors 7. As shown in FIG. 2, the in-slot portion 8a of the outer conductor 8 is insulated from the in-slot portion 7a of the inner conductor 7 by an insulating paper 10. Both the in-slot portions 7a, 8a are also insulated from the armature core 3 by the insulating paper 10.

e) The claws 3c formed on the outer periphery of the armature core 3 (refer to FIG. 6) are bent to close the openings of the slots 3b (refer to FIG. 2). Thus, the inner conductors 7 and the outer conductors 8 inserted into the slots 3b are firmly held therein.

f) The side portion 8b is bent at the bending portion 8c at a substantially right angle so that the side portion 8b is positioned along (in parallel to) the axial end surface of the armature core 3. After all of the in-slot portion 8a of the outer conductors 8 are inserted, the side portions 8b may be simultaneously bent, or they may be bent one by one.

g) The side portions 8b bent in parallel to the axial end surface of the armature core 3 are skewed by a predetermined angle β (β>α) relative to the radial line connecting the center of the slot 3b and the center of the armature core 3. In this process, the side portions 8b are skewed in the direction opposite to the direction in which the side portions 7b of the inner conductors 7 are skewed. The side portions 8b are arranged in a form as shown in FIG. 7. The side portions 8b are positioned not to contact one another. An insulating disc 11 having a center hole 11a (shown in FIG. 1) is disposed between the side portions 7b of the inner conductors 7 and the side portions 8b of the outer conductors 8. The thickness of the insulating disc 11 is made substantially equal to a height that is obtained by adding both heights of the projection 7d of the inner conductor 7 and the projection 8d of the outer conductor 8. The outer peripheries of the projections 7d, 8d are positioned to engage with the center hole 11a of the insulating disc 11, as shown in FIGS. 1, 5B and 5C.

h) Both projections 7d and 8d are welded together to establish electrical and mechanical connections therebetween, forming connecting portions 12 as shown in FIG. 5B.

i) Lastly, the armature shaft 2 is forcibly inserted into the center hole 3a of the armature core 3c, and thereby the armature shaft 2 is firmly connected to the armature core 3.

Advantages obtained in the embodiment described above will be summarized. It is not required to form the inner and outer conductors 7, 8 in a U-shape (which has been conventionally done) before they are inserted into the slots 3b of the armature core 3. Therefore, a straight conductor bar including plural inner or outer conductors connected in line can be easily manufactured by a rolling process, for example. In other words, the inner and the outer conductors can be continuously and economically manufactured without using an expensive transfer press. Since the inner and outer conductors 7, 8 are in a straight form (not in the U-shape as in the conventional case), the conductors 7, 8 are easily and correctly positioned in the process of inserting into the slots 3b. Accordingly, the inserting process can be speeded up.

Since both projections 7d and 8d are positioned to face each other and welded together, as shown in FIG. 5B, the connecting portion 12 does not extend in the axial direction beyond the outer surface of the side portions 8b of the outer conductors 8. Therefore, an axial length of the armature 1 can be shortened, compared with that of the conventional armature. Since the welding process for connecting the both projections 7d, 8d is carried out before the armature shaft 2 is inserted into the armature core 3, tools and jigs for performing the welding process can be easily positioned without interfering with the armature shaft 2. Since the outer peripheries of the projections 7d, 8d are engaged with the inner hole 11a of the insulating disc 11, a centrifugal force applied to the side portions 8b can be partly borne by the insulating disc 11. Therefore, the armature 1 withstands a higher rotational speed.

Since the side portions 7b, 8b of the inner and outer conductors 7, 8 are bent toward the axial surfaces of the armature core 3 after the in-slot portions 7a, 7b are inserted into the slots 3b, the projections 7d, 8d do not hinder smooth insertion of the conductors 7, 8 into the armature core 3. Since the outer conductors 8 inserted into the slots 3b are firmly held by bending the claws 3c and then the side portions 8b are bent toward the axial surface of the armature core 3, it is not necessary to hold the outer conductors 8 with jigs or tools in the process of bending the side portions 8b. Accordingly, the bending process is simplified and speeded up.

Since the bending portions 7c, 8c of the inner and outer conductors 7, 8 are made thinner than the thickness of the in-slot portions 7a, 8a, the side portions 7b, 8b can be easily and precisely bent. Therefore, the bending process can be preformed with a smaller bending force, and positioning of the projected portions 7d, 8d can be easily done to exactly face each other.

Since the axial surface of the side portions 8b is utilized as a commutator surface, a conventional cylindrical commutator to be connected to the armature shaft 2 is eliminated. Therefore, the armature 1 can be made smaller and lighter. Since the width of the side portion 8b of the outer conductor 8 is made to be gradually widened from the inside toward the outside, as shown in FIG. 7. Therefore, a wider area is utilized as a commutator surface. The thickness of the side portion 8b is made to change in inverse proportion to its width, and thereby the cross-sectional area of the side portion 8b is substantially uniform throughout its entire length. Accordingly, the electrical resistance in the side portion 8b can be kept low, and a higher output can be realized.

Figure 8:
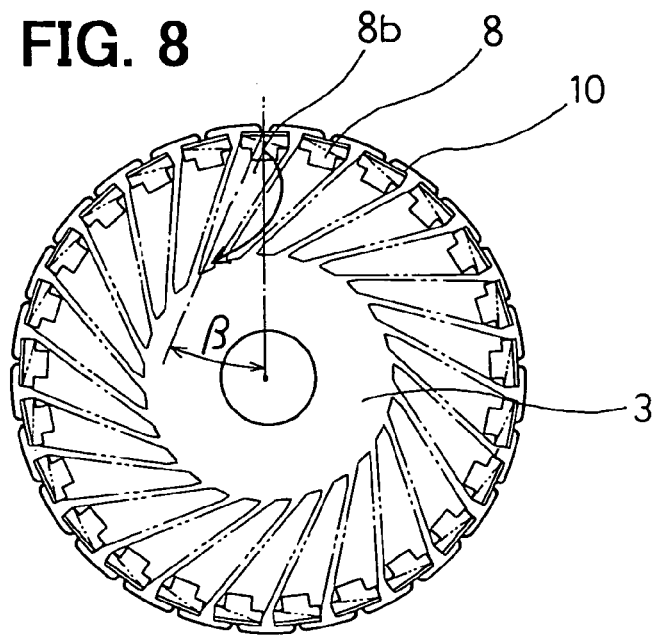
FIG. 8 is a view similar to FIG. 7, showing a combined process of bending and skewing side portions of conductors.

A modified form of the present invention will be described with reference to FIG. 8. In this modified form, the side portions 7b, 8b of the inner and outer conductors 7, 8 are skewed at the same time when they are bent toward the axial surface of the armature core 3. Though FIG. 8 only shows a process of simultaneously bending and skewing (by a skew angle β) the side portions 8b of the outer conductors 8, the side portions 7b of the inner conductors 7 are similarly bent and skewed (by α in the direction opposite to β). Since the bending portions 7c, 8c of the inner and outer conductors 7, 8 are bent and skewed at the same time, the skewing process can be carried out without being hindered by a work-hardening that generated in the preceding process, i.e., the bending process. Accordingly, the process of manufacturing the armature 1 is further speeded up.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of manufacturing an armature having a plurality of conductors inserted into slots formed around an outer periphery of an armature core, the method comprising:

forming a plurality of conductors, each conductor having an in-slot portion and a pair of side portions extending straight from both ends of the in-slot portion, a bending portion having a thickness smaller than a thickness of the in-slot portion being formed between the in-slot portion and the side portion so that the conductor is easily bent at the bending portion;

inserting conductors into the slots;

bending the side portions of the conductors at the bending portions at substantially right angle so that the side portions are positioned substantially in parallel to axial end surfaces of the armature core; and skewing the side portions of the conductors by a predetermined angle relative to a radial line connecting a center of the slot and a center of the armature, wherein:

the step of bending and the step of skewing are performed simultaneously after all of the conductors are inserted into the slots.

2. The method of manufacturing an armature as in claim 1, wherein:

each conductor is separated from a conductor bar that is formed to include a plurality of conductors.

3. The method of manufacturing an armature as in claim 1, wherein:

the conductors inserted into each slot are composed of an inner conductor that is disposed at an inner portion of the slot and an outer conductor that is disposed at an outer portion of the slot, a width of each side portion of the outer conductor being widest at a portion connected to the bending portion and a thickness of each side portion of the outer conductor being thinnest at a portion connected to the bending portion, so that a cross-sectional area of each side portion is substantially equal throughout an entire length of each side portion of the outer conductor; and after the simultaneous bending and skewing step, the side portions of the inner conductors and the side portions of the outer conductors are electrically and mechanically connected, and then an armature shaft is forcibly inserted into a center hole of the armature core.

4. The method of manufacturing an armature as in claim 3, wherein:

the armature core includes claws for closing the slots, the claws being formed on the outer periphery of the armature core; and after all the conductors are inserted into the slots and before the side portions thereof are simultaneously bent and skewed, the slots are closed by the claws.

5. The method of manufacturing an armature as in claim 3, wherein:

the side portions of the inner conductors and the outer conductors are electrically and mechanically connected at their radial inside tips by welding.

* * * * *